March 13, 1962 — G. A. LYON — 3,025,112
WHEEL COVER
Filed May 25, 1959 — 2 Sheets-Sheet 1
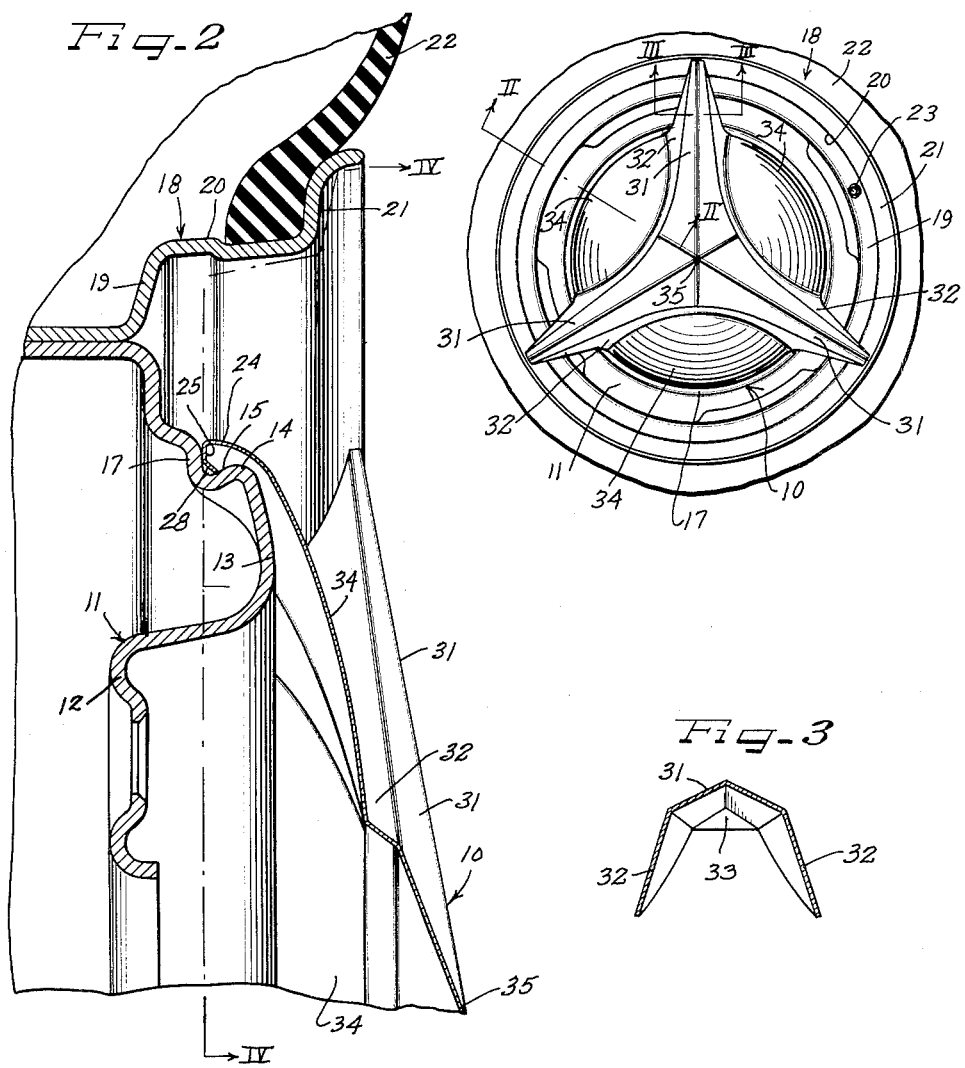
Inventor
George Albert Lyon
by Hill, Sherman, Meroni, Gross & Simpson
Attys.

March 13, 1962  G. A. LYON  3,025,112
WHEEL COVER
Filed May 25, 1959  2 Sheets-Sheet 2
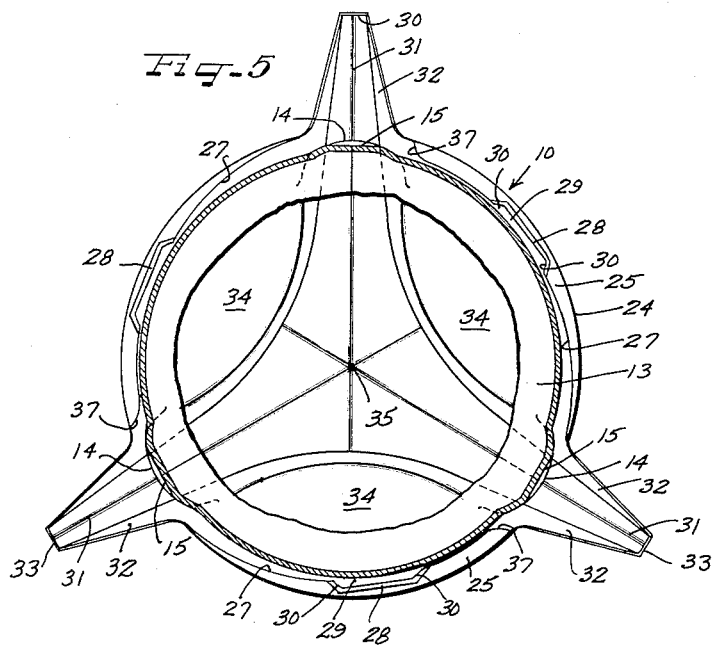
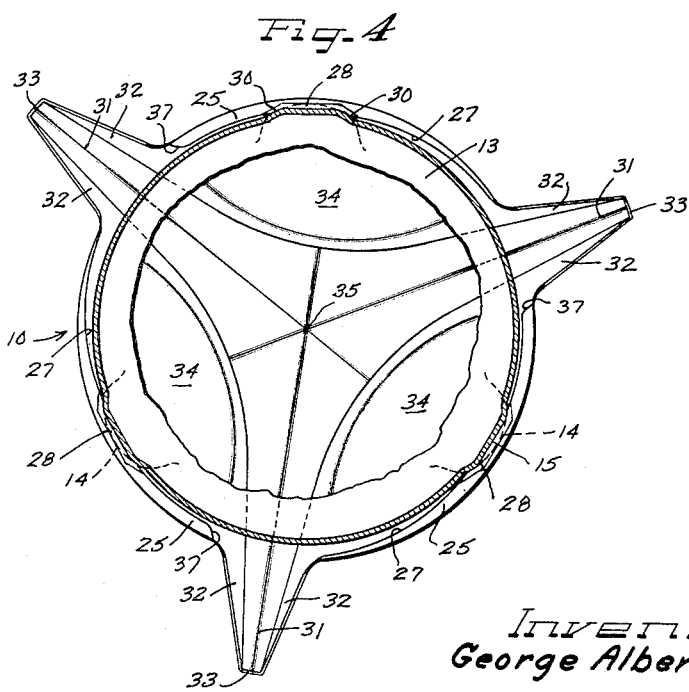
Inventor
George Albert Lyon United States Patent Office 3,025,112
Patented Mar. 13, 1962

3,025,112
WHEEL COVER
George Albert Lyon, Detroit, Mich., assignor to Lyon Incorporated, Detroit, Mich., a corporation of Delaware
Filed May 25, 1959, Ser. No. 815,535
14 Claims. (Cl. 301—37)

The present invention relates to improvements in wheel structures and more particularly concerns the ornamental and protective covering of the outer sides of vehicle wheels such as automobile wheels.

An important object of the present invention is to provide an improved wheel structure wherein the wheel body is provided with radially outwardly projecting cover retaining protrusions and a cover member is provided which is constructed and arranged to be assembled over the wheel and retained thereon by turning the same to interengage interlock structure on the cover with the retaining protrusions on the wheel body.

Another object of the invention is to provide an improved ornamental and protective cover for disposition over the outer side of a vehicle wheel having retaining protrusions on the wheel body, the cover member having novel means for engagement with and disengagement from retaining protrusions by turning the cover through the medium of spoke arms serving as handles for this purpose.

A further object of the invention is to provide an improved wheel structure wherein a wheel body has cover retaining protrusions and a cover member is provided with cam interlock flange means interengageable in a novel manner with the retaining protrusions by relative assembly turning of the cover member and the wheel.

Still another object of the invention is to provide an improved one-piece sheet metal wheel cover of resilient material having resiliently flexible marginal cam flange retaining means engageable with cover retaining protrusions on a wheel by rotary or axial assembly movements.

Other objects, features and advantages of the present invention will be readily apparent from the following detailed description of a preferred embodiment taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is an enlarged fragmentary sectional detail view taken substantially on the line III—III of FIGURE 1;

FIGURE 4 is a rear elevational and sectional view taken substantially on the line IV—IV of FIGURE 2 but on a smaller scale; and FIGURE 5 is a rear sectional elevational view similar to FIGURE 4 but showing the cover in a different position relative to retaining protrusions on the wheel.

A wheel cover member 10 is constructed and arranged to be applied in covering relation over the outer side of a vehicle wheel such as an automobile wheel including a wheel body 11 having a central bolt-on flange 12 about which is an annular axially outwardly projecting nose bulge 13 having at the radially outer side thereof a circumferentially spaced series such as three cover retaining protrusions or bumps 14 each providing an undercut shoulder 15 and having at the axially inner and radially outer side thereof a generally axially outwardly facing seating shoulder 17. About its periphery the wheel body 11 supports a multi-flange, drop center tire rim 18 including an outer side flange 19 merging with an intermediate axially outwardly extending flange 20 having at the outer side thereof a terminal flange 21. A pneumatic tire 22 which may be of the tubeless type is supported by the tire rim 18 which forms therewith an air chamber adapted to be supplied with air through a valve stem 23 projecting from the side flange 19.

According to the present invention, the cover 10 is constructed to be applied in a more or less easy on, hard off relationship over the outer side of the wheel and more particularly is constructed to be applied by a snap-on or rotary camming assembly manipulation and to be removed by a rotary or torsional disassembly manipulation. To this end, the cover is made from resilient sheet material, desirable forms of which comprise stainless steel, brass, aluminum alloy, and the like, which may be readily die worked into shape from flat strip or sheet blanks. In fact, the construction of the cover 10 in the present instance readily adapts it to be shaped by means of rubber die techniques enabling use of prepolished blanks, that is fully polished on the outer or exposed surface before shaping of the cover.

In general formation, the cover 10 comprises a hub cap of a diameter to overlie the central portion of the wheel including the bolt-on flange 12 and the nose bulge 13, with marginal means for retaining interengagement with the bump protrusions 14. Such retaining structure on the cover member comprises means for not only snap-on but also torsional interengagement with the protrusions 14, and for this purpose a circular generally axially extending margin 24 on the cover member is of an inside diameter to telescope in assembly in spaced relation about the retaining protrusions 14, with generally radially inwardly directed cover retaining terminal flange segments 25 thereon engageable with the respective shoulders 15 of the protrusions. As best seen in FIGURE 2, the underturned retaining flange segments 25 are in this instance arranged to bottom against the wheel body shoulder 17 for thereby determining the axially inward position of the cover on the wheel.

Having reference to FIGURES 4 and 5, there are as many of the retaining flange segments 25 as there are retaining bumps 14, in this instance three equidistantly circumferentially spaced. Each of the retaining flange segments 25 is provided with a generally spiral edge 27 starting from minimum or zero width at one circumferential end to maximum width at the opposite circumferential end portion. At the minimum width end portion of the retaining flange segment 25 in each instance the radius from the center of the cover is substantially greater than the radius from the center of the wheel to the minimum diameter portions of the protrusion shoulders 15, thus enabling free torsional assembly of the respective retaining flange segments 25 with the retaining shoulders 15 by turning of the cover from the position wherein the minimum width ends of the flanges are clear of the retaining protrusions as shown in FIGURE 5 into the retaining interengagement relationship shown in FIGURE 4.

At the minimum radius portions of the retaining flange edges 27, they are on a diameter which is slightly greater than the diameter about the radially outer side of the nose bulge 13, but smaller than the diameter about the minimum radius, axially innermost portions of the shoulders 15. Thereby, as the cover 10 is turned into retaining engagement of the edges 27 with the retaining shoulders 15, there is freedom from frictional resistance engagement of the edges 27 with the adjacent confronting side of the nose bulge 13 but there is a gradual frictional interengagement of the edges 27 with the retaining shoulders 15. As this edge engagement continues along the diminishing radius spiral of the edges 27, the rigid retaining protrusion shoulders 15 force the retaining flanges 25 and thereby the contiguous portions, at least, of the cover margin 24 resiliently flexibly radially outwardly and thus place the same under progressively increasing tension working radially inwardly toward the retaining shoulders. This is taken advantage of to effect a firm, substantially interlocked interengagement with the retaining protrusions 14 by radially inwardly and axially outwardly obliquely inturned retaining terminals 28 provided within inset respective notches 29 in the flange edges 27 at or adjacent to the widest portions of the flanges 25 and of a width to receive the retaining protrusions between circumferential side shoulders 30 defining the notches. At their edges the retaining terminals 28 are on a diameter which is slightly less than the diameter about the engaged portions of the retaining protrusion shoulders 15 so that there is a continuous tensioned thrust of the edges of the retaining terminals against the shoulders 15 serving not only to resist strongly axially outward displacement of the cover from the wheel but also to cause a camming axially inward thrust reaction to press the flanges 25 against the seating shoulder 17 of the wheel body. Rotary displacement of the cover 10 relative to the wheel is resisted by the side shoulders 30 confronting the circumferential sides of the retaining protrusions 14, thus maintaining the cover corotative with the wheel.

By virtue of the oblique disposition of the retaining terminal portions 28, instead of a torsional application of the cover, it may be pressed into retaining relation to the retaining bumps 14. When this is to be done, the cover is generally centered with respect to the wheel and two of the retaining terminals 28 are oriented into alignment with the retaining shoulders 15 of two of the retaining protrusions, and the remaining retaining terminal 28 is then resiliently cammed over the nose of the associated retaining protrusion 14 until it snaps cammingly behind the shoulder 15 into retaining relation therewith and thus completes retention of the cover on the wheel.

Removal of the cover 10 from the wheel is adapted to be effected by applying sufficient torque to the cover to cause the flaringly directed circumferential side shoulder 30 on the diminishing width portion of the flange 25 to ride on the confronting complementally slanted flaring side of the associated protrusion 14 and thus flex the diminishing width portion of the flange 25 radially outwardly so that in the continuing turning cover releasing movement the adjacent portion of the flange edge 27 rides onto the protrusion shoulder 15 and then eases off due to the increasing spiral radius until the retaining protrusion is in the clear relative to the flange 25 and the cover can be lifted away from the wheel.

Means to facilitate turning of the cover member 10 for effecting retaining engagement of the cover terminals 28 with the retaining protrusions 14, comprise a plurality of radially extending spoke arms 31 projecting from the dome shell of the cover member 10 and conveniently formed in one-piece therewith, of hollow form opening axially and radially inwardly. Since in this instance there are three of the retaining protrusions 14 and thus three of the retaining flanges 25 on the cover, three of the spoke arms 31 are provided all joined at the center of the cover and projecting to a distance beyond the margin 24 of the cover to overlie the tire rim 18 and with the tips of the spoke arms inside the lip of the terminal flange 21. Each of the spoke arms 31 has a rigid crest which may be of angularly related longitudinal panel flange arrangement as shown and with the crest portions of the arms angularly joined to opposite side walls 32 which are relatively flexible resiliently normal to their respective planes although the crest or ridge portions of the arms are quite rigid. At their axially inner edges beyond the cover margin 24, the arm side walls 32 are contoured to slope toward the tips of the arms and clear the underlying portion of the terminal flange 21. Rigidity and finish at the tip of the arm 31 in each instance is afforded by an axially extending terminal flange 33 as best seen in FIG. 3.

Each of the spoke arms 31 is located between the ends of respective ones of the cover retaining flanges 25 and separates the same to the extent of the spacing between the widest portions of the arm side wall flanges 32. Moreover, the arms 31 separate the cover between the arms into generally segmental panel portions 34 joined to the arm side walls 32 throughout the inner boundaries of the portions 34, whereby the segmental cover portions 34 are rendered at least slightly resiliently relatively deflectable by the resilient deflectability afforded by the arm side walls 32. This resilient deflectability is enhanced by having the inner joining end portions of the arms 31 of substantial width so that the segmental cover portions 34 are of generally lenticular outline in plan. In the arrangement shown it will be observed that juncture of the divergently related arms 31 provides a central raised crown 35 for the cover, the arms and the segmental portions 34 together providing a hollow axially inwardly opening shell over the central portion of the wheel.

In applying the cover over the outer side of the wheel, the spoke arms 31 serve as convenient rigid handles for manipulating the cover rotatably. Initially the cover 10 may be assembled with the wheel in centered relation as depicted in FIGURE 5 with the protrusions 14 received within the hollow arms 31 and the retaining flanges 25 seated against the wheel body shoulder 17, then by turning the cover through the spoke arm handles 31 to run the flange edge 27 at the narrow end portions of the flanges 25 onto the retaining projection shoulders 15, flexing of the cover margin occurs in the continued rotation of the cover until the retaining terminal portions 28 snap into engagement with the shoulders 15 on entry of the retaining bumps into the notches 29, the side stop shoulders 30 preventing overrun of the cover rotatively relative to the wheel and more particularly the retaining protrusions 14. Removal of the cover from the wheel is effected in reverse order, by applying sufficient turn-off torque through the spoke arm handles 31 to flex the diminishing width portion of the flange 25 onto the retaining protrusion shoulders 15 and then free therefrom. At termination of the turn-off, stop ends 37 on the widest end portions of the retaining flanges 25 will bear against the opposing sides of the retaining protrusions 14 and stop the turn-off rotation, thus indicating when the retaining protrusions are freely within the hollow arms 31 so that the cover can be freely lifted away from the wheel.

It will be understood that modifications and variations may be effected without departing from the scope of the novel concepts of the present invention.

I claim as my invention:

1. In a wheel structure including a wheel body having an annular nose bulge with radially outwardly projecting circumferentially spaced cover retaining protrusions provided with undercut generally radially outwardly and axially inwardly facing retaining shoulders, a cover for disposition at the outer side of the wheel including a circumferential series of cover retaining flange portions providing generally radially inwardly and axially outwardly projecting free spiral edges engageable with the protrusion shoulders and being in one portion of longer radius from the center of the cover than the diameter about the shoulders and of shorter radius from the center of the cover than such diameter in another portion whereby to enable torsional engagement and release of the flange portions with respect to said shoulders, said shorter radius portions effecting resiliently tensioned cover-retaining engagement with said shoulders.

2. In a wheel structure including a wheel body having cover retaining protrusions provided with radially outwardly and axially inwardly facing undercut-like rigid shoulders, a cover member for disposition over the outer side of the wheel having a generally axially inwardly extending marginal formation for telescopically spaced disposition about the protrusions and formed with generally radially inwardly extending underturned cover retaining flange portions having spiral edges projecting freely generally radially inwardly and torsionally engageable with said shoulders on turning the cover member relative to the wheel body.

3. In a wheel structure including a wheel body having cover retaining protrusions provided with radially outwardly and axially inwardly facing undercut-like rigid shoulders, a cover member for disposition over the outer side of the wheel having a generally axially inwardly extending marginal formation for telescopically spaced disposition about the protrusions and formed with generally radially inwardly extending underturned cover retaining flange portions having spiral edges torsionally engageable with said shoulders on turning the cover member relative to the wheel body, each of said flange portions having a cam edge engaging the retaining shoulder and provided with a notched terminal resiliently tensioned into retaining engagement with the shoulder in each instance, said notched terminal having at each circumferential side thereof a shoulder opposing the protrusion to maintain the cover member and the wheel corotative.

4. In a wheel structure including a wheel body having cover retaining protrusions thereon providing generally radially outwardly and axially inwardly facing rigid shoulders, a cover member for disposition over the outer side of the wheel having spiral cam resilient flanges projecting generally radially inwardly and having free edges retainingly engageable with the shoulders by relative turning of the cover member and the wheel body, and handle means on the cover member for turning manipulation of the cover member.

5. In a wheel structure including an axially outer side portion having thereon a circumferentially spaced series of cover retaining protrusions provided with axially inwardly and generally radially facing cover retaining shoulders, a cover for disposition over the outer side of the wheel having concealed therebehind underturned flange portions notched out complementary to said protrusions and having terminal edges in the notches engageable in tensioned retaining thrusting relation against said shoulders, said notches having at the circumferential sides thereof shoulders opposing the protrusions to maintain the cover corotative with the wheel.

6. In a wheel structure including a disk spider wheel body supporting a tire rim, said wheel body having on the outer side thereof a circumferential series of cover retaining protrusions each having a generally radially outwardly and axially inwardly facing undercut-like shoulder, a hub cap-type cover for concealingly overlying the central portion of said wheel body and said protrusions and having a generally axially inwardly directed margin of a diameter to telescopically encompass said protrusions in radially outwardly spaced relation thereto, said margin having an underturned generally radially inwardly extending flange structure including portions thereof extending radially inwardly to a smaller diameter than the diameter about said shoulders, said flange portions having generally radially inwardly and axially outwardly directed free terminal edges engaging said shoulders under resilient tension and cammed axially inwardly on said shoulders.

7. In a hub cap-type wheel cover, a cover member having a generally circular perimeter provided with a generally radially inwardly extending flange structure comprising a plurality of circumferentially extending spiral cam flange portions engageable with retaining protrusions on a wheel body by torsional relative movement of the cover and the wheel body, said spiral cam flanges having intermediate the ends of the edge portions thereof protrusion receiving notches for interlockingly coacting with such protrusions.

8. In a hub cap-type wheel cover, a cover member having a generally circular perimeter provided with a generally radially inwardly extending flange structure comprising a plurality of circumferentially extending spiral cam flange portions engageable with retaining protrusions on a wheel body by torsional relative movement of the cover and the wheel body, said spiral cam flange portions being on individual relatively resiliently flexible segment portions of the cover separated by flexible flange means, each of said spiral cam flange portions projecting generally radially from the segment portion of which it is a part and being of longer radius at one end as measured from the center of the cover member than the diameter about such retaining protrusions but progressing toward its other end to a substantially shorter radius from such center whereby to enable said torsional relative movement engagement by starting at the longer radius ends of the spiral cam portions and progressively working toward the shorter radius ends thereof and thereby effecting progressive resiliently tensioned cover-retaining engagement of such protrusions by the shorter radius parts of the spiral cam flange portions.

9. In a hub cap-type wheel cover, a cover member having a generally circular perimeter provided with a generally radially inwardly extending flange structure comprising a plurality of circumferentially extending spiral cam flange portions engageable with retaining protrusions on a wheel body by torsional relative movement of the cover and the wheel body, said spiral cam portions being on individual relatively resiliently flexible segment portions of the cover separated by flexible flanges comprising side walls of integral hollow rigid-crest spoke arms also serving as handles for imparting torsional assembly movement to the cover.

10. In a one-piece sheet material hub cap-type cover member, a generally circular cover body having a plurality of generally radially extending substantially rigid spoke arms connected at the center of the member and projecting radially outwardly substantially beyond the perimeter of the member, said arms separating the member into a plurality of relatively resiliently flexible segments, each of said segments having on its perimeter a generally radially inwardly extending flange with a spiral cam inner edge adapted to engage with protrusions on a wheel body by torsional effort applied through said arms.

11. In a one-piece sheet material hub cap-type cover member, a generally circular cover body having a plurality of generally radially extending substantially rigid spoke arms connected at the center of the member and projecting radially outwardly substantially beyond the perimeter of the member, said arms separating the member into a plurality of relatively resiliently flexible segments, said segments having generally radially inwardly projecting concealed retaining flanges each of which is provided with an edge notch having therein a turned retaining terminal engageable with a protrusion of a wheel body to which the member may be applied.

12. In a hub cap-type wheel cover member, a shell formed from sheet material and of predetermined diameter having a plurality of axially inwardly hollow spoke arms formed thereon and projecting radially outwardly beyond the perimeter of the member and thereby separating the perimeter into a plurality of segments, each of said segments having thereon a generally radially inwardly projecting circumferential spiral cam flange of minimum width adjacent one circumferential end and of maximum width adjacent the opposite circumferential end, said minimum width and maximum width ends of the spiral cam flanges being separated by the respective hollow spoke arms, the hollow spoke arms affording clearance for reception of retaining protrusions on a wheel body engageable with said spiral cam flanges by turning of the cover relative thereto, said maximum width end portions of the flanges providing generally circumferentially facing stop shoulders to limit cover-separating turning of the cover member relative to such protrusions.

13. In a wheel structure including a wheel body supporting a tire rim, the wheel body having an annular nose bulge with cover retaining protrusions on its radially outer side and providing rigid generally undercut-like radially outwardly and axially inwardly facing shoulders, a one-piece sheet material hub cap-type cover member for disposition over the outer side of the wheel body and comprising a cover body having a plurality of generally radially extending substantially rigid spoke arms separating the body into a plurality of relatively resiliently flexible segments, each of said segments having on its perimeter a generally radially inwardly directed spiral cam flange portion engageable with a protrusion shoulder by turning of the cover member through torsional effort applied to said arms, said spiral cam flange portions engaging said protrusions under resilient tension resulting from resilient flexing of said segments.

14. In a one-piece sheet material hub cap-type cover member, a generally circular cover body having a generally radially facing side wall and a plurality of generally radially extending substantially rigid hollow axially inwardly opening spoke arms connected at the center of the member and projecting radially outwardly substantially beyond the perimeter of the body, said arms having spaced apart side walls and separating the side wall of the body into a plurality of circumferentially spaced relatively resiliently radially flexible segments, each of said segments having on its perimeter a radially projecting spiral cam edge adapted to engage with protrusions on a wheel body by torsional effort applied through said arms.

References Cited in the file of this patent

UNITED STATES PATENTS

| | | |
|---|---|---|
| D. 93,769 | Horn | Nov. 6, 1934 |
| 1,488,458 | Ecaubert | Mar. 25, 1924 |
| 2,159,881 | Booth | May 23, 1939 |
| 2,199,888 | Lyon | May 7, 1940 |
| 2,544,703 | Lyon | Mar. 13, 1951 |
| 2,597,882 | Lyon | May 27, 1952 |
| 2,680,551 | Brosky | June 8, 1954 |
| 2,733,104 | Lyon | Jan. 31, 1956 |
| 2,819,929 | Hunt | Jan. 14, 1958 |

FOREIGN PATENTS

| | | |
|---|---|---|
| 500,897 | Great Britain | Feb. 17, 1939 |